United States Patent [19]

Mack et al.

[11] Patent Number: 5,439,979
[45] Date of Patent: Aug. 8, 1995

[54] SEPARATING MATERIALS

[75] Inventors: Margot Mack, Fürth; Joachim Kinkel, Guldental, both of Germany

[73] Assignee: Merck Patent Gesellschaft Mit Beschrankter Haftung, Darmstadt, Germany

[21] Appl. No.: 658,903

[22] Filed: Feb. 22, 1991

[30] Foreign Application Priority Data

Feb. 24, 1990 [DE] Germany .................. 40 05 868.9

[51] Int. Cl.⁶ .............................. C08L 33/24
[52] U.S. Cl. ................... 525/218; 523/205; 525/221
[58] Field of Search ............ 523/205; 525/218, 221

[56] References Cited

U.S. PATENT DOCUMENTS

| | | | |
|---|---|---|---|
| 4,882,048 | 11/1989 | Blaschke et al. | 502/402 |
| 4,914,159 | 4/1990 | Böer et al. | 525/328.2 |
| 4,937,000 | 6/1990 | Bömer et al. | 525/328.2 |

OTHER PUBLICATIONS

Klaus K. Unger "Packings and Stationary Phases in Chromatographic Techniques" No. 13: "Theory and Design of Chiral Stationary Phases for the Direct Chromatographic Separation of Enantiomers" by William H. Pirkle and Thomas C. Pochapsky.

*Primary Examiner*—Paul R. Michl
*Assistant Examiner*—U. K. Rajguru
*Attorney, Agent, or Firm*—Millen, White, Zelano, & Branigan

[57] ABSTRACT

The invention relates to separating materials for thin-layer chromatography, based on sorbent-coated supports, the sorbent essentially comprising optically active poly(meth)acrylamides bonded to silica gel, and a binder system comprising a mixture of carboxyl-containing polyvinyl and acrylate polymers.

11 Claims, No Drawings

SEPARATING MATERIALS

The invention relates to separating materials for thin-layer chromatography based on sorbent-coated supports which essentially comprise optically active poly(meth)acrylamides bonded to silica gel, and a binder system.

These materials are suitable for separating racemic mixtures into their optical antipodes.

Adsorbents based on optically active poly(meth)acrylamides bonded to silica gel are disclosed in German Offenlegungsschrift 36 19 303. The adsorbents described therein are suitable for column chromatography, in particular for high-pressure liquid chromatography or gradient elution. However, these HPLC processes have the following disadvantages:

Complex equipment is necessary, and a considerable amount of time is required to prepare, carry out and optimise the process. In addition, only one sample can be analysed in one run. For routine analyses and in particular for in-process control, for example in enantioselective syntheses, column-chromatographic processes are therefore unsuitable.

German Offenlegungsschrift 36 19 303 contains no indication of the use of the known optically active separating materials in thin-layer technology, nor is there any indication of how the chiral phase can be transferred to the thin-layer plate.

It is known from the literature that transfer of chiral phases from the column to the thin-layer plate is not easily possible since, inter alia, the binders necessary for the thin layer usually have a considerable influence on the separation. Any interactions between the binder and the chromatographically active groups can result in the interactions between the enantiomers to be separated and the chromatographically active groups being absent or so weakened that separation cannot be achieved.

The object of the present invention is to produce optically active separating materials for thin-layer chromatography (TLC and HPTLC) which are suitable for separating racemic mixtures.

It has now been found that, surprisingly, excellent separating materials for thin-layer chromatography are obtained using the combination according to the invention of a binder system and a chromatographically-active phase which comprises optically active poly(meth)acrylamides bonded to silica gel.

The invention therefore relates to separating materials for thin-layer chromatography, based on sorbent-coated supports, characterised in that the sorbent essentially comprises optically active poly(meth)acrylamides bonded to silica gel, and a binder system comprising a mixture of carboxyl-containing polyvinyl and acrylate polymers.

The invention also relates to a process for the production of these separating materials in which the optically active poly(meth)acrylamide derivative/silica gel composite material is prepared by reacting silica gel or hydrophilically modified silica gel with optically active (meth)acrylamide derivatives under the conditions of a polymerisation reaction, together with the binder system comprising a mixture of carboxyl-containing polyvinyl and acrylate polymers, is suspended in an aqueous, organic or aqueous/organic medium, the pH of the suspension is set to between 6.5 and 8.0, and this suspension is applied to the support in a known manner.

Finally, the invention also relates to the use of the separating materials according to the invention for the thin-layer chromatographic separation of racemic mixtures into the optical antipodes.

In general, any desired optically active acrylamides or methacrylamides can be employed as monomers, with the optically active centre in the amide radical.

However, the optically active poly(meth)acrylamides are preferably prepared from polymerisable monomers of the formula I

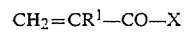

in which
$R^1$ is H or methyl and
X is an aliphatic or aromatic amide radical, which is bonded via the nitrogen and contains at least one optically active carbon atom, and which may also be substituted by a further (meth)acrylamide radical,
an optically active amino acid derivative which is bonded via the nitrogen or
—$NR^2Y$ where $R^2$ is H or alkyl having up to 5 carbon atoms and Y is a monosaccharide or oligosaccharide radical.

X in the formula I is preferably an amide radical which is bonded via the nitrogen and is derived from the corresponding amine HX. X here preferably has the subformula Ia

in which
$R^3$ and
$R^4$ are each, independently of one another, A, cycloalkyl having 3-7 carbon atoms, cycloalkylalkyl having 4-11 carbon atoms, bicycloalkyl having 7-14 carbon atoms, bicycloalkylalkyl having 8-18 carbon atoms, Ar or Ar-alkyl, where these radicals may furthermore be monosubstituted or polysubstituted by A, cycloalkyl, cycloalkylalkyl, halogen, cyano, amino, mono- or disubstituted amino, hydroxyl and/or by a further meth)acrylamide radical, and one of the radicals $R^3$ and $R^4$ may alternatively be H with the proviso that at least one asymmetric C atom is present in $R^3$ and/or $R^4$,
A or -alkyl is alkyl or alkylene having 1-8 carbon atoms in which one or two non-adjacent $CH_2$ groups may be replaced by —O—, —CO—, —OCO— or —CO—O—, and
Ar is phenyl or naphthyl.

Preferably, one of the radicals $R^3$ and $R^4$ is H and the other is a radical containing an optically active active carbon atom.

In the formula Ia above, A has 1-8, preferably 1, 2, 3, 4, 5 or 6 carbon atoms. A is preferably methyl, ethyl, propyl, isopropyl, butyl, isobutyl, sec. butyl, tert.butyl, pentyl, 1-, 2- or 3-methylbutyl, hexyl, 1,1-, 1,2- or 2,2-dimethylpropyl, 1-ethylpropyl, 1-, 2-, 3- or 4-methylpentyl, 1,1-, 1,2-, 1,3-, 2,2-, 2,3- or 3,3-dimethylbutyl, 1- or 2-ethylbutyl, 1-ethyl-1-methylpropyl, 1-ethyl-2-methylpropyl, 1-methylhexyl or 2-octyl.

Accordingly, -alkyl is preferably methylene, ethylene, propylene, butylene, isopropylene, isobutylene, pentylene, 1-, 2- or 3-methylbutylene, hexylene, 1,1-, 1,2- or 2,2-dimethylpropylene, 1-ethylpropylene or 1- or 2-ethylbutylene.

Cycloalkyl is preferably cyclopropyl, cyclobutyl, cyclopentyl, cyclohexyl or cycloheptyl, but alternatively, for example, 1-, 2- or 3-methylcyclopentyl, 1-, 2-, 3- or 4-methylcyclohexyl, 2-methyl-5-isopropylcyclohexyl or 2-isopropyl-5-methylcyclohexyl (=menthyl or neomenthyl).

Accordingly, cycloalkylalkyl is preferably cyclopropylmethyl, 1-cyclopropylethyl, 2-cyclopropylethyl, cyclobutylmethyl, 1-cyclobutylethyl, 2-cyclobutylethyl, cyclopentylmethyl, 1-cyclopentylethyl, 2-cyclopentylethyl, cyclohexylmethyl, 1-cyclohexylethyl, 2-cyclohexylethyl, but alternatively, for example, 1-, 2-or 3-methylcyclopentylmethyl, 1-(1-, (2-, (3- or (4-methylcyclohexyl)ethyl or 2-(1-, (2-, (3- or (4-methylcyclohexyl)ethyl.

Bicycloalkyl is preferably 1- or 2-decalyl, 2-bicyclo[2.2.1]heptyl or 6,6-dimethyl-2-bicyclo[3.1.1]heptyl.

Halogen is preferably F, Cl or Br, but alternatively I.

Ar is preferably phenyl, furthermore o-, m- or p-tolyl, o-, m- or p-ethylphenyl, o-, m- or p-methoxyphenyl or 1- or 2-naphthyl.

Accordingly, Ar-alkyl is preferably benzyl, 1- or 2-phenylethyl, o-, m- or p-methylbenzyl, 1- or 2-o-, m- or p-tolylethyl, o-, m- or p-ethylbenzyl, 1- or 2-o-, m- or p-ethylphenylethyl, 1- or 2-naphthylmethyl or -ethyl.

Preference is also given to compounds of the formula I, in which X is $-NR^2Y$ where $R^2$ is H or alkyl, preferably having 1,2 or 3 carbon atoms, and Y is a monosaccharide or oligosaccharide radical. Preference is given to monosaccharides or disaccharides, such as, for example, glucosyl, arabinosyl, ribosyl, galactosyl, fructosyl, lactose or saccharose radicals. The hydroxyl groups may each be free or protected by, for example, methyl or acetyl groups. The saccharide radicals may have an open-chain or cyclic form. Suitable radicals are generally pentoses, hexoses, disaccharides or trisaccharides, or alternatively glycosidic compounds.

Preference is also given to compounds of the formula I in which X is an optically active amino acid derivative which is bonded via the nitrogen and is derived from the corresponding amino acid. This derivative preferably has up to 15 carbon atoms in the main chain.

Amino acid derivatives which can be employed are esters, amides, the free acids or alternatively amino acid amides which are substituted on the amide nitrogen.

Preference is given to amino acid alkyl esters having up to 7 carbon atoms in the alkyl chain, which may be straight-chain or branched. Also preferred are phenyl esters. The substituent on the amide group which may be present is preferably an alkyl group having up to 7 carbon atoms, which may likewise be straight-chain or branched, or a phenyl group. Other suitable substituents on an amino acid amide group of this type are naphthyl, benzyl, p-alkylbenzyl and other substituted phenyl groups. Disubstitution on the nitrogen, preferably by alkyl groups is also possible.

All generally known and accessible optically active amino acids can be employed here. Particularly preferred radicals are those derived from the following amino acids: alanine, phenylalanine, phenylglycine, valine, leucine, isoleucine, serine, threonine, aspartic acid, asparagine, glutamic acid, glutamine, lysine, arginine, histidine, tyrosine, tryptophan or ornithine. The methyl, ethyl and propyl esters of these amino acids are particularly preferred.

Any hydroxyl or amino groups present may be in free or in protected form.

A smaller group of particularly preferred compounds of the formula I is given below.

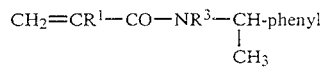

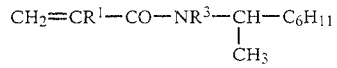

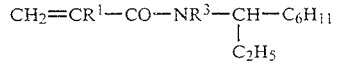

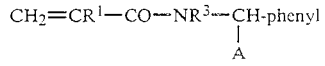

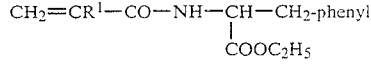

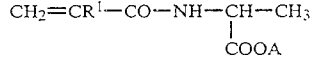

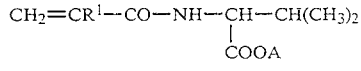

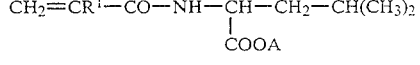

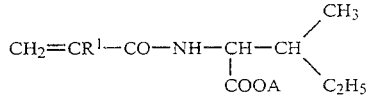

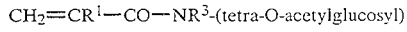

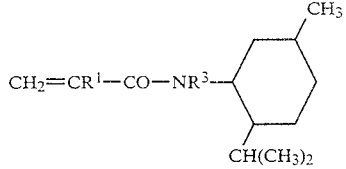

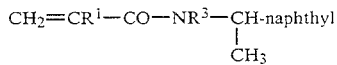

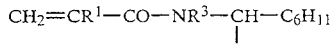

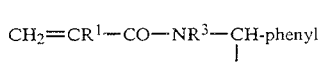

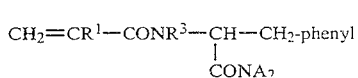

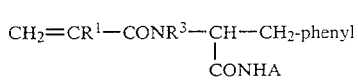

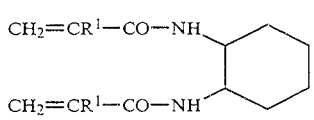

-continued

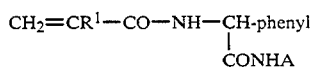

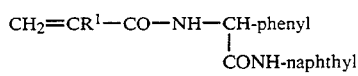

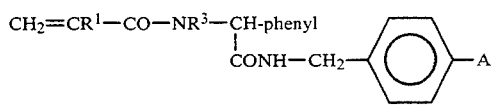

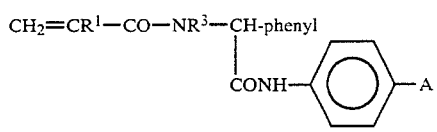

The compounds of the formula I which contain two (meth)acrylmide radicals, such as, for example, N,N'-methylenebisacrylamide or N,N'-1,2-cyclohexylenebisacrylamide, can be employed as chiral cross-linking agents in addition to other monomers.

The compounds of the formula I can generally be prepared by reacting the corresponding amines or amino acid derivatives HX with reactive methacrylic acid or acrylic acid derivatives, preferably in the presence of a polymerisation inhibitor at temperatures between about −5° and 60° C.

The reaction is advantageously carried out at 0° to 15° C. using an inert organic solvent, in particular an aromatic hydrocarbon (for example toluene), or a halogenated hydrocarbon, such as methylene chloride or chloroform. The reaction times are between about 30 minutes and 4 hours and depend essentially on the reaction temperature. The reaction conditions are described in numerous places in the literature.

The optically active polyamides are preferably bonded to hydrophilic silica gels. Diol-, NH$_2$— or cyano-modified silica gels are preferred here. Diol-containing silica gels are particularly preferred. Silica gels modified in this way are known and commercially available for TLC and HPTLC. However, it is also possible to employ other support materials, for example aluminium oxides or titanium oxides.

The preparation of these polyamides bonded to silica gel by two different routes is described exactly in German Offenlegungsschrift 36 19 303. The first process variant comprises reacting a hydrophilic silica gel directly with monomers of the formula I under conventional conditions of a polymerisation reaction.

In the second variant, the silica gel is first modified, preferably esterified, using a (meth)acrylic acid derivative, and this material is subsequently subjected to free-radical copolymerisation in suspension with a monomer of the formula I, the polymer being covalently bonded to the silica gel.

A person skilled in the art can deduce the reaction conditions from the abovementioned literature.

The process according to the invention for the preparation of the TLC separating materials is carried out as follows.

The optically active poly(meth)acrylamide derivative/silica gel composite material is suspended together with the binder system in an aqueous or aqueous/organic medium. The binder system is a mixture of two different types of generally known binders. The first binder is based on polymers of acrylates, and the second on polyvinylpolymers which contain carboxyl groups and are optionally in salt form.

Preferred species of the first binder component, the polymers of acrylates, are polymers of acrylic acid esters. Preferred polymers are products like ACRONAL ® (manufactured by BASF, Germany), which are commercially available as suspensions having an average size of 0.2 µm.

Preferred species of the second binder component are polyacrylic acid or polymethacrylic acid with a molecular weight between 1 and 5 million; especially preferred is polyacrylic acid having a molecular weight between 3 and 5 million.

The review article of H. E. Hauck and W. Jost in "Packings and Stationary Phases in Chromatographic Techniques" (K.K. Unger ed., Marcel Dekker, New York and Basle, 1990) gives an overview about binder systems used for TLC plates.

Surprisingly, it has been found that the mixture of these two binders gives stable, hard and abrasion-resistant layers having a smooth surface.

The ratio between binder 1 (acrylate polymer) and binder 2 (carboxyvinyl polymer) can be selected between 4:1 and 1:2, the preferred range being 3:1 to. 1:1.

The suspension medium may either be purely aqueous or aqueous/organic, the organic solvent employed preferably being an alcohol, such as, for example, ethanol, methanol or propanol.

The ratio between organic solvent and water may be chosen as desired. A ratio of from 1:20 to 1:5 is preferred.

Of course, purely organic solvents are also suitable.

When preparing this suspension, it is possible, if desired, to stir in a fluorescence indicator at this point of the process. The indicators which are generally known to a person skilled in the art are suitable for this purpose.

The most frequently used indicator is a fluorescence indicator, preferably magnesium tungstate which absorbs at 254 nm in the UV or a manganese activated zinc silicate.

The ratio between binders and sorbent may range from 1:20 to 1:80 (weight to weight); preferred is a range from 1:40 to 1:60.

The pH of the suspension is then set to a value in the range from 6.5–8.0. The pH range 6.7–7.5 is preferred. A noticeable thickening of the suspension occurs during this operation. The suspension is then coated onto the support in a conventional manner. Suitable supports, in addition to the preferred glass plates are also, for example, aluminium foils or plastic films.

The coating thickness of the chirally modified silica gel layer of the separating materials according to the invention is, as in conventional TLC or HPTLC separating materials, normally in an order of magnitude of from 100 to 300 µm.

However, in exceptional cases or for specific applications, separating materials having thinner or thicker layers can also be produced.

The materials according to the invention enable rapid separation of racemic mixtures. These chirally modified thin-layer plates are highly suitable as a pilot method for optimizing analogous HPLC separations, for rapid process control of stereo-selective syntheses and for series analysis of pharmaceuticals.

Suitable eluents are liquid hydrocarbons, such as hexane, heptane and octane, or ethers or C$_1$-C$_4$-alcohols, in particular the mixtures thereof. Alcoholic- /aqueous reversed phases are also highly suitable. If desired, the hydrocarbons and alcohols may also be mixed with lower halogenated hydrocarbons, such as dichloromethane or chloroform.

A further advantage of the materials according to the invention is that the substances to be separated can be employed directly without further derivatisation.

The following examples are intended to illustrate the invention in greater detail.

Production of plates according to the invention:

Example 1

150 ml of water, 15 ml of ethanol, 1.2 ml of Acronal® 27 D acrylate polymer suspension (solids content 40%) and 0.5 g of Carbopol® 940 polyvinyl polymer are stirred from 30 minutes at room temperature in a high-speed stirrer unit. 50 g of poly(1-cyclohexylethyl)acrylamide/silica gel composite material (prepared in accordance with German Offenlegungsschrift 36 19 303 by insitu polymerization of a HPTLC silica gel 60/diol material (about 6 μm) with (S)-(+)-1-cyclohexylethylacrylamide in the presence of a free-radical former) and if desired, 1 g of fluorescence indicator (absorbing at 254 nm in the UV) are added, and the mixture is stirred for a further 30 minutes. The pH is determined, and the mixture is neutralized to pH 7.0 using 2N NaOH, during which a noticeable thickening of the suspension occurs.

The mixture is stirred for a further 90 minutes, evacuated, aerated and then coated in a conventional manner onto the TLC plates.

The plates are ready for use after drying for 1 hour at about 100° C.

Example 2

A plate according to the invention is produced analogously to Example 1, but the poly(1-cyclohexylethyl)acrylamide/silica gel composite material is replaced by a poly(L-phenylalanylethyl ester) acrylamide/silica gel composite material.

Example 3

A plate according to the invention is produced analogously to Example 1, but the silica gel composite material used therein is replaced by a poly-L-menthylacrylamide/silica gel composite material.

Example 4

A plate according to the invention is produced analogously to Example 1, but the pH is adjusted to 6.5 and stirring is continued for 60 minutes.

Example 5

A plate according to the invention is produced analogously to Example 2, but using the following binder combinations: 1.8 ml of Acronal® 27 D and 0.25 g of Carbopol®. A pH of 7.5 is set and stirring is continued for about 120 minutes.

Example 6

A plate according to the invention is produced analogously to Example 1, but using a poly(N-acryloyl-L-phenylalanine diethyl amide)/silica gel composite material.

Example 7

A plate is produced analogously to Example 1, but the pure poly(1-cyclohexylethyl)acrylamide/silica gel composite material is replaced by an analogous material prepared by in-situ polymerization of a HPTLC silica gel 60/diol material with a mixture of 90% of (S)-(+)-1-cyclohexylehtylacrylamide and 10% of N,N-(S,S)-1,2-cyclohexylenebisacrylamide (crosslinking agent).

Use Examples

Example A

The following racemic compounds were separated using the HPTLC plate described in Example 1.

| Substance (R,S)-compound | Eluent | Rf values |
|---|---|---|
| (R,S)-cyclopenthiazide | n-hexane/dioxane 20/80 | 0.36 0.43 |
| (R,S)-pentflutizide | n-hexane/dioxane 35/65 | 0.21 0.31 |

Example B

The following racemic compounds were separated using HPTLC plate described in Example 2.

| Substance (R,S)-compound | Eluent | Rf values |
|---|---|---|
| (R,S)-chlorothalidone | n-hexane/dioxane 20/80 | 0.50 0.57 |
| (R,S)-N-benzoyl-N'-(2-phenyl)butanoyl-urea | tert.butyl methyl ether/THF 80/20 | 0.53 0.70 |
| Benzyl (R,S)-2-(tert. butyl)-5-oxooxazolidine-3-carboxylate | n-hexane/dioxane 80/20 | 0.63 0.67 |
| (R,S)-3-benzoyl-2-(tert.butyl)-oxazolidin-5-one | n-hexane/dioxane 80/20 | 0.51/0.64 |

What is claimed is:

1. A sorbent for thin-layer chromatography, based on sorbent-coated supports, which essentially comprises optically active poly(meth)acrylamides bonded to silica gel and a binder system comprising a mixture of carboxyl-containing polyvinyl polymers and acrylate polymers.

2. A sorbent according to claim 1, wherein the optically active poly(meth)acrylamides are obtained from polymerizable compounds of the formula I $$CH_2=CR^1-CO-X \qquad I$$

in which

R$^1$ is H or methyl and

—X is an aliphatic or aromatic amide radical which is bonded via the nitrogen and contains at least one optically active carbon atom, and optionally substituted by a further (meth)acrylamide radical, an optically active amino acid derivative which is bonded via the nitrogen or —NR$^2$Y where R$^2$ is H or alkyl having up to 5 carbon atoms and Y is a monosaccharide or oligosaccharide radical.

3. A sorbent according to claim 1, wherein the optically active poly(meth)acrylamides are obtained from polymerizable compounds of formula I $$CH_2=CR^1-CO-X \qquad I$$

in which R$^1$ is H or methyl and a) X is of the subformula —NR³R⁴, wherein
  i) R³ and R⁴ are each, independently of one another, A, cycloalkyl having 3-7 carbon atoms, cycloalkyl alkyl having 4-11 carbon atoms, bicycloalkyl having 7-14 carbon atoms, bicycloalkylalkyl having 8-18 carbon atoms, Ar or Ar-alkyl, which are optionally monosubstituted or polysubstituted by A, cycloalkyl, cycloalkylalkyl, halogen, cyano, amino, mono- or disubstituted amino, hydroxyl and/or by a further (meth)acrylamide radical; or
    one of the radicals R³ and R⁴ is H with the proviso that at least one asymmetric C atom is present in R³ or R⁴; wherein
  ii) A and -alkyl are each, independently of one another, alkyl or alkylene having 1-8 carbon atoms in which one or two non-adjacent CH₂ groups may be replaced by —O—, —CO—, —OCO— or —CO—O—, and
  iii) Ar is phenyl or naphthyl; or
b) X is of the subformula —NR²Y, wherein
  i) R² is H or alkyl having up to 5 carbon atoms and
  ii) Y is a monosaccharide or disaccharide which is glucosyl, arabinosyl, ribosyl, galactosyl, fructosyl, lactose or saccharose radical; or
c) X is an optically active amino acid derivative with up to 15 carbon atoms in the main chain, which is bonded via the nitrogen.

4. A sorbent-coated support for use in thin-layer chromatography wherein the sorbent comprises optically active poly(meth)acrylamide bonded to silica gel and a binder system comprising a mixture of carboxyl containing polyvinyl polymers and acrylate polymers.

5. A sorbent suspension for coating supports for use in the thin-layer chromatography comprising optically active poly(meth)acrylamides bonded to silica gel, and a binder system comprising a mixture of carboxyl-containing polyvinyl polymers and acrylate polymers in an aqueous, organic or aqueous/organic medium having a pH between 6.5 and 8.0.

6. A sorbent coated support as in claim 4, wherein the weight ratio of binder to sorbent ranges from 1:20 to 1:80.

7. A sorbent suspension as in claim 5, wherein the weight ratio of binder to sorbent ranges from 1:20 to 1:80.

8. A process for the production of a sorbent-coated support which comprises providing an optically active poly(meth)acrylamide derivative/silica gel composite material, prepared by reacting silica gel or hydrophilically modified silica gel with optically active monomers of the formula I of claim 2 under the conditions of a polymerization reaction, together with a binder system comprising a mixture of carboxyl-containing polyvinyl and acrylate polymers, in suspension, in an aqueous, organic or aqueous/organic medium, where the pH of the suspension is between 6.5 and 8.0, applying and drying this suspension on a support.

9. A chromatographic separation process for the separation of racemic mixtures into the optical antipodes, the improvement comprising utilizing the sorbent-coated support of claim 4.

10. A process as in claim 8, wherein the weight ratio of binder to sorbent ranges from 1:20 to 1:80.

11. An optically active poly(meth)acrylamide bonded to silica gel useful for the chromatographic separation of racemic compounds, wherein the poly(meth)acrylamide is obtained form polymerizable compounds of formula I $$CH_2=CR^1-CO-X \quad\quad I$$

in which
  R¹ is H or methyl and
  X is an aliphatic or aromatic amide radical which is bonded via the nitrogen and contains at least one optically active carbon atom, and is substituted by a further (meth)acrylamide radical or
    is an optically active amino acid derivative which is bonded via the nitrogen, with the proviso that this amino acid derivative is not an ester or
    is —NR²Y where R² is H or alkyl having up to 5 carbon atoms and Y is a monosaccharide or oligosaccharide radical.

* * * * *